United States Patent [19]

Osanai

[11] 4,240,551
[45] Dec. 23, 1980

[54] MAGNETIC TAPE CASSETTE HOLDER

[75] Inventor: Akira Osanai, Hachioji, Japan

[73] Assignee: Olympus Optical Co., Ltd., Tokyo, Japan

[21] Appl. No.: 883,798

[22] Filed: Mar. 6, 1978

[30] Foreign Application Priority Data

Mar. 11, 1977 [JP] Japan .............. 52-29953[U]
Mar. 15, 1977 [JP] Japan .............. 52-31648[U]
Mar. 15, 1977 [JP] Japan .............. 52-31649[U]

[51] Int. Cl.³ ........................................ B65D 85/672
[52] U.S. Cl. ................................ 206/387; 206/821
[58] Field of Search ............. 206/387, 821; 211/40

[56] References Cited

U.S. PATENT DOCUMENTS

| | | | |
|---|---|---|---|
| 2,766,891 | 10/1956 | Elzer | 206/821 X |
| 3,317,087 | 5/1967 | Landis | 206/821 X |
| 3,510,008 | 5/1970 | Mason | 211/40 |
| 3,635,350 | 1/1972 | Wolf | 211/40 |
| 3,746,180 | 7/1973 | Spiroch et al. | 206/387 X |
| 3,760,937 | 9/1973 | Van Wyn Garden et al. | 206/387 |
| 3,786,927 | 1/1974 | Manheim | 211/40 |
| 3,889,817 | 6/1975 | Berkman | 206/387 X |
| 3,909,088 | 9/1975 | Dennehey et al. | 206/387 X |
| 3,995,921 | 12/1976 | Ackeret | 206/387 X |

*Primary Examiner*—Stephen P. Garbe
*Attorney, Agent, or Firm*—Frishauf, Holtz, Goodman & Woodward

[57] ABSTRACT

A magnetic cassette holder includes a synthetic resin box having a pair of cassette holding chambers each having an opening through which cassette is inserted, a cutout for permitting the hubs of the cassette to be exposed, capstan inserting hole and cassette positioning hole, in which the front ends of the cassettes are exposed.

2 Claims, 15 Drawing Figures

MAGNETIC TAPE CASSETTE HOLDER

BACKGROUND OF THE INVENTION

This invention relates to a magnetic tape cassette holder and in particular to a magnetic tape cassette holder as used in a cassette type player having a Stahl type cassette detachable device.

Recently, magnetic tapes as used for a tape recorder are almost all formed in a cassette form from the standpoint of its portability and operability. A tape recorder correspondingly becomes smaller in size so that it can be suitably used in such a cassette tape. With the development of a Stahl type cassette detachable mechanism, automatic reverse mechanism etc., such cassette tape has been widely accepted and proved very handy as a car-stereo tape player. Recent tendency is toward further miniaturization of the cassette, and in a car-stereo tape player using an ultra-small magnetic tape cassette called "a microcassette", the loading and unloading of such microcassette into and out of the interior panel of an automobile is cumbersome partly due to its smallness and partly due to an unstable condition inside the automobile. For this reason, a somewhat larger microcassette shows a rather good operability. It is desirable that at least two microcassettes can be sequentially used in a simple operation since the tape operation time is predetermined for each microcassette.

DETAILED DESCRIPTION

In the Figures, a compact microcassette of a matchbox size is shown, but this invention can be also applied to any other compact or miniaturized cassette.

Figure 1:
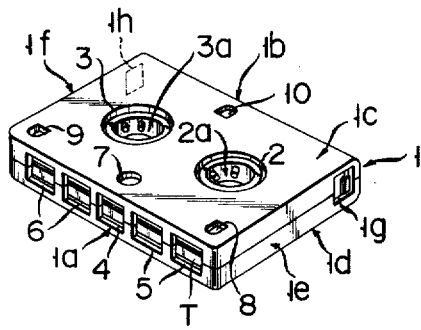
FIG. 1 is a perspective view showing one example of a microcassette which can be loaded into a cassette holder according to this invention.

FIG. 1 is a perspective view showing a microcassette of a small match-box size. Tape hubs 2 and 3 are provided within the microcassette with one left center and the other at the right center. The tape hubs are rotatably mounted within the microcassette and exposed at their upper and lower surfaces. The tape hubs 2 and 3 have holdes 2a and 3a, respectively, into which drive shafts, not shown, are inserted. At the front end 1a of the microcassette 1 are provided five windows, a central one 4 corresponding to a pinch roller, not shown, of a tape recorder, and two left ones 5 and two right ones 6 corresponding to a recording/reproducing magnetic head and erasing magnetic head, not shown, respectively. The windows 5 and 6 are symmetrically arranged with the central window 5 as a center. A magnetic tape T is wound around the tape hubs 2 and 3 with its ends fixed to the tape hubs 2 and 3, respectively. A portion of the tape T is adapted to run across the windows, 4, 5, 6 through a guide roller, not shown, within the microcassette 1. Apart from the holes 2a and 3a, a capstan inserting hole 7 and microcassette positioning holes 8, 9 and 10 are provided in the microcassette in a manner to extend through the upper and lower panels 1c and 1d of the microcassette. The capstan inserting hole 7 is located midway near a front end 1a. The holes 8 and 9 are located one at each front-side corner of the upper and lower and surfaces 1c and 1d of the microcassette 1 and the hole 10 is positioned midway at the rear-side edge portion of the upper and lower surfaces 1c and 1d of the microcassette.

A capstan, not shown, of the tape recorder is rotatably inserted into the hole 7 and positioning pins, not shown, of the tape recorder are fitted into the corresponding holes 8, 9 and 10. Holes 1g and 1h are provided at the rear-side end faces 1e and 1f of the microcassette to accommodate erroneous erasure preventing luges.

Figure 2:
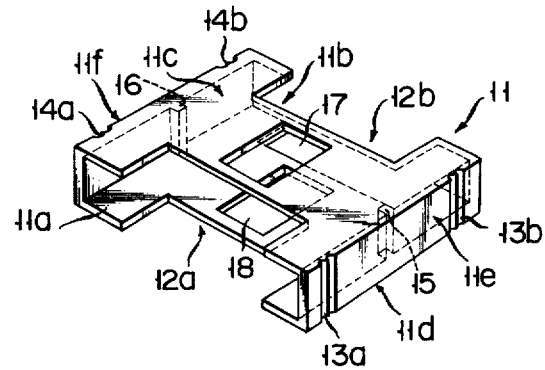
FIG. 2 is a perspective view showing a cassette holder per se according to one embodiment of this invention.

FIG. 2 is a perspective view showing a cassette holder 11 of this invention, which is made by one-piece mold of synthetic resin. The cassette holder 11 comprises a somewhat flattened, box-like support with their front and rear end opened to receive corresponding tape cassettes. Upper and lower panels 11c and 11d of the support 11 are recessed at the opened front and rear end portions of the holder to provide a pair of symmetrical recesses 12a and 12b where the tape hubs of the cassette are exposed. The support sleeve is H-shaped in a plan view. Two pairs of hand-grip grooves 13a, 13b and 14a, 14b are provided two at each left and right side walls 11e and 11f of the holder 11 and extend in a direction vertical to the longitudinal direction of the holder 11. A pair of central boundary ridges 15, 16 are provided one at each of the inner opposite side walls of the holder and extend in a direction vertical to the longitudinal direction of the holder. When two microcassettes 21 and 31 (see FIG. 3) are inserted into the holder 11, the ridges 15 and 16 on the holder 11 serve as stoppers, since the rear shoulders of the cassettes abut against the ridges 15 and 16. The ridges 15 and 16 also serve to equally hold these two cassettes in place in the holder 11. A pair of rectangular holes 17 and 18 are provided one at each of the central portion of the upper and lower panels 11c and 11d of the holder 11. When the two cassettes 21 and 31 are inserted, as shown in FIG. 3, into the holder 11 i.e. one from one opening 11a and one from the other opening 11b of the holder, the rectangular holes 17 and 18 of the holder 11 permit rear-side central positioning holes 30 and 40 of the two cassettes, respectively, to be exposed.

Figure 3:
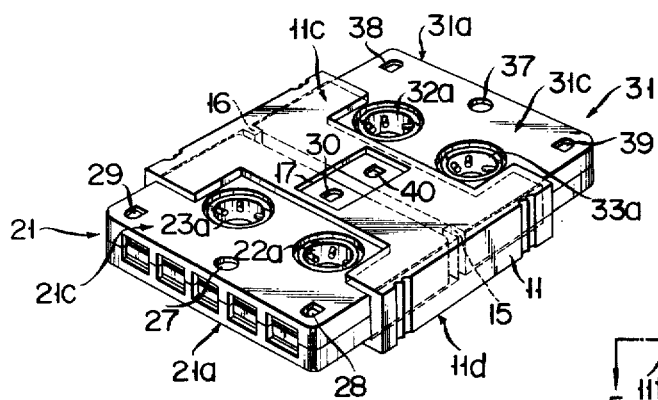
FIG. 3 is a perspective view showing the holder of FIG. 2 in which two microcassettes are loaded.

The two microcassettes 21 and 31 of the type as shown in FIG. 1 are inserted, as shown in FIG. 3, into the holder 11 such that their front-side end portions are exposed toward the openings 11a and 11b (see FIG. 2) of the holder 11. At this time, the rear shoulders of the two microcassettes abut against the ridges 15 and 16 on the holder 11, thereby holding them in place in the holder 11. In the state shown hubs 22a and 23a of one microcassette 21 are located inside the recess 12a of the holder 11 and, hubs 32a and 33a of the other micocassette 31 inside the recess 12b of the holder 11. The rear-side central positioning holes of the microcassettes 21 and 31 are located inside the rectangular holes 17 and 18 of the holders 11. The other holes 28 and 29 and capstan inserting hole 27 of the microcassette 21, as well as the holes 38 and 39 and capstan inserting hole 37 on the front-side surface portion of the microcassette 31, are left exposed outside the holder 11. In other words, when the microcassettes are inserted into the holder, all the holes on the microcassettes are left uncovered or exposed. Such microcassette loading holder is inserted into an insertion hole of a car-stereo tape recorder (not shown) with, for example, a Stahl type detachable mechanism, such that only the microcassette 21 is held in place in the insertion hole of the tape recorder. In this state, the operative members of the tape recorder are inserted into the corresponding holes in the same manner as a single cassette is used, permitting the tape recorder, not shown, to be operated. If the other microcassette 31 is to be used, it is only necessary that the holder 11 be inserted end for end into the insertion hole of the tape recorder with only the microcassette 31 held in the insertion hole of the tape recorder. Such holder proves advantageous when two microcassettes are sequentially used. In this case, the holder can be readily inserted into, and removed from, the insertion hole of the tape recorder, by gripping the hand-grip grooves 13a and 13b or 14a and 14b, without giving any hand touch to the microcassette. The holder 11 also serves as a protector for the microcassettes. Such holder 11 becomes comewhat thicker, and wider in its lateral dimension, than a single microcassette per se. This disadvantage is circumvented by using a rigid material for the holder 11 and making the holder thinner. At the same time, the inner surface of the insertion hole of the tape cassette is so formed as to have a proper elasticity. Such a construction permits the insertion of the microcassette with or without the use of the holder.

Figure 4:
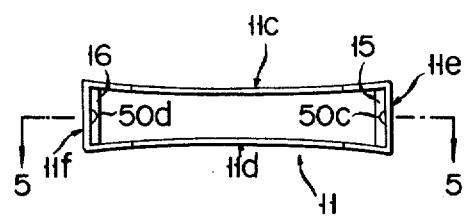
FIG. 4 is a front view showing a cassette holder according to a second embodiment of this invention.
Figure 5:
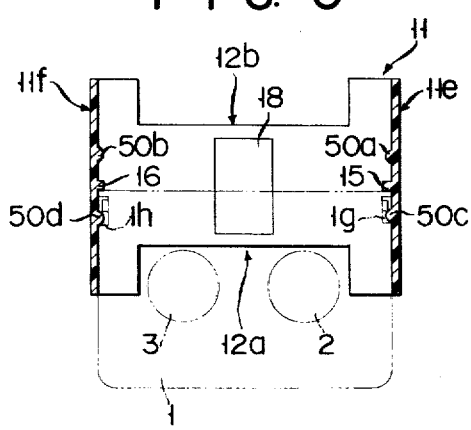
FIG. 5 is a cross-sectional view as taken along line 5—5 of FIG. 4.

In an embodiment shown in FIGS. 4 and 5 a holder 11 is so designed that microcassettes, once inserted into the holder 11, are not easily slipped out of the holder 11. In the embodiment shown in FIGS. 2 and 3 there is a risk that the microcassettes will be slipped out of the holder 11 since they are merely inserted into the corresponding holes of the holder 11.

In FIGS. 4 and 5, the holder 11 is made of a rigid material and it is formed as thin as possible. Upper and lower panels 11c and 11d of the holder 11 are somewhat dished as shown in FIG. 4 and click beads 50a and 50b, and 50c and 50d, are provided on inner side walls 11e and 11f of the holder 11 so as to be snap-fitted into the erroneous erasure preventing lug holes 1g and 1h (see FIG. 1) of the microcassettes. When the microcassette is inserted into the holder 1, it is normally pressed into frictional contact with the dished upper and lower panels 11c and 11d of the holder 11, thereby preventing clattering of the microcassette in the holder 11. Further, the beads 50a to 50d are snap-fitted into the lug holes 1g and 1h. In consequence, the microcassette is completely prevented from being slipped out of the holder 11.

The microcassette holder of this invention can advantageously save a storage space for the microcassettes.

Figure 6:
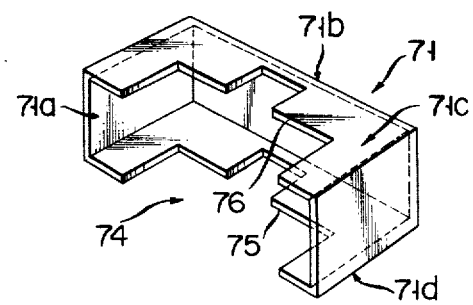
FIG. 6 is a perspective view showing a cassette holder per se according to a third embodiment of this invention.
Figure 7:
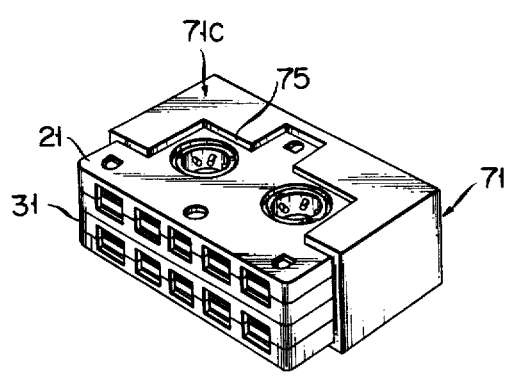
FIG. 7 is a perspective view showing the holder of FIG. 6 in which two microcassettes are loaded.

FIGS. 6 to 7 show a microcassette holder according to a third embodiment of this invention. In FIG. 6 the cassette holder 71 comprises a rectangular box-like configuration with its front end 71a opened to provide an opening 74. As shown in FIG. 7, microcassettes 21 and 31 are inserted one upon the other into the opening 74 of the holder 11 with their rear end portions held in place in the holder. A pair of substantially T-shaped cutouts 75, 76 are provided one at each of the open-end edge portions of upper and lower panels 71c and 71d of the holder 11. When the microcassettes 21 and 31 are inserted into the holder 11, the cutouts 75 and 76 permit tape hubs and rear-side microcassette-positioning holes of the microcassettes to be exposed. With the rear portions of the microcassettes held in the holder 71, capstan inserting holes and front-side microcassette-positioning holes of the respective microcassettes are left exposed. The holder 71 is formed very thin by molding etc., since it is made of a rigid synthetic resin etc. The microcassette-loaded holder 11 is substantially equal in its entire dimension to a stack of two microcassettes 21 and 31.

In consequence, when such microcassette-loader holder 71 is inserted in a top-loading type tape cassette player, not shown, with for example one microcassette 31 held flat in the player, the player can be operated in the same way as a single microcassette. In this case, the upper half portion of the holder 71, corresponding to the microcassette 21, is projected upwardly out of the holder, and serves as a hand-grip portion when the holder is removed from the player. When the microcassette 21 is sequentially used after the completion of the operation of the microcassette 31, it is only necessary that the holder be loaded end for end into the player with the microcassette 21 held in the player. Such microcassette-loaded holder 71 can also be inserted into a cassette player having a Stahl type detachable mechanism. That is, the holder 71 is inserted into the player with the front ends of the microcassettes directed toward the insertion hole of the player. In this case, the player can be operated in the same way as a holderless microcassette and the operability is far advantageous, since the two microcassettes are inserted as a compact unit into the holder 71 and have a double thickness. When the two microcassettes are sequentially used, it is only necessary that one microcassette is relocated end for end with respect to the other.

With the microcassettes so held compact in the holder 71, the holder 71 serves as a cassette case. If such microcassette-loaded holder 71 is inserted into the player, any extra storage space is unnecessary for the two microcassettes.

Figure 8:
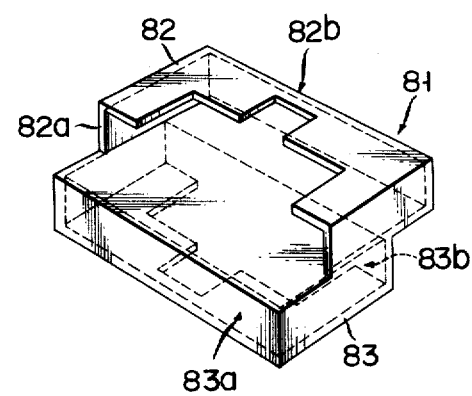
FIG. 8 is a perspective view showing a cassette holder according to a fourth embodiment of this embodiment.

FIG. 8 is a perspective view showing a cassette holder having upper and lower microcassette holding sections with their front ends opened in the directions opposite to each other. In FIG. 8, the upper and lower microcassette holding sections are stacked one over the other with the longitudinal half portion of one microcassette holding section jointed to the longitudinal half portion of the other microcassette holding section. When two microcassettes are inserted one into the upper microcassette holding section the other into the lower microcassette holding section, the front end of the mirocassettes is located on the same plane as the rear end of the upper and lower microcassette holding sections. As a result, a double-layer stack is obtained. The double-layer stack is similar to the microcssette-loaded holder of FIG. 7, except that the front ends of the upper and lower microcassette holding sections are directed in the mutually opposite directions. Further explanation of this embodiment is, therefore, omitted.

However, there is a fear that, in the above-mentioned embodiments shown in FIGS. 2 and 3 and 6 to 8, the microcassettes will be slipped out of the holder since they are merely inserted into the holder.

Figure 9:
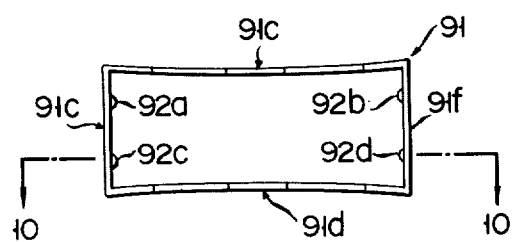
FIG. 9 is a front view showing a cassette holder according to a fourth embodiment of this invention.
Figure 10:
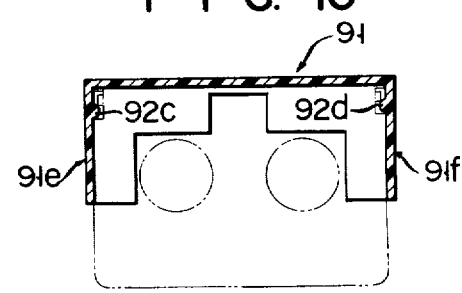
FIG. 10 is a cross-sectional view taken along line 10—10 of FIG. 9.

FIGS. 9 and 10 show a modified form of the holder of FIG. 6. In FIGS. 9 and 10, the holder 91 is made of a rigid material and formed very thin in its walls. Upper and lower panels 91c and 91d of the holder 91 are substantially dished, as shown in FIG. 9, toward the interior of the holder 91 and click ridges 92a . . . 92d are provided on the opposite inner side walls 91e and 91f of the holder so as to be engaged with the erroneous erasure lug holes 1g, 1h of the microcassettes.

When the microcassettes are inserted into the holder 91, they are pressed into frictional contact with the upper and lower panels of the holder, thereby preventing microcassette clattering in the holder. Further, the click ridges 92a to 92d of the holder are snap-fitted into the lug holes 1g and 1h of the cassette. As a result, the microcassettes can be completely prevented from being slipped out of the holder. Although in this modification the click ridges 92a to 92d and dished upper and lower panels are applied to the embodiment of FIG. 7, this invention can also applied to the embodiment of FIG. 8 with the same result.

Figure 11:
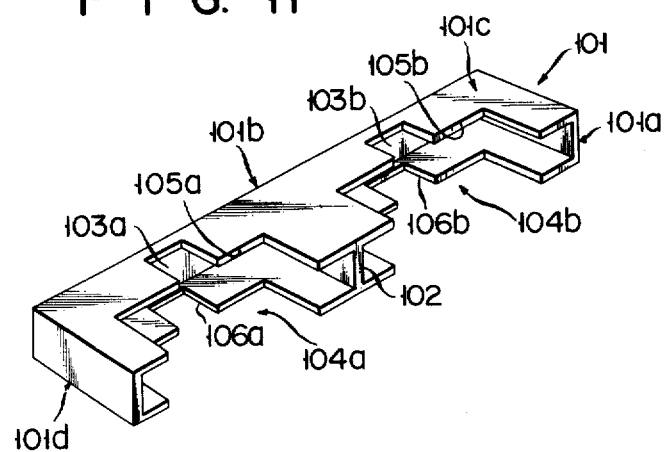
FIG. 11 is a perspective view showing a cassette holder according to a fifth embodiment of this invention.
Figure 12:
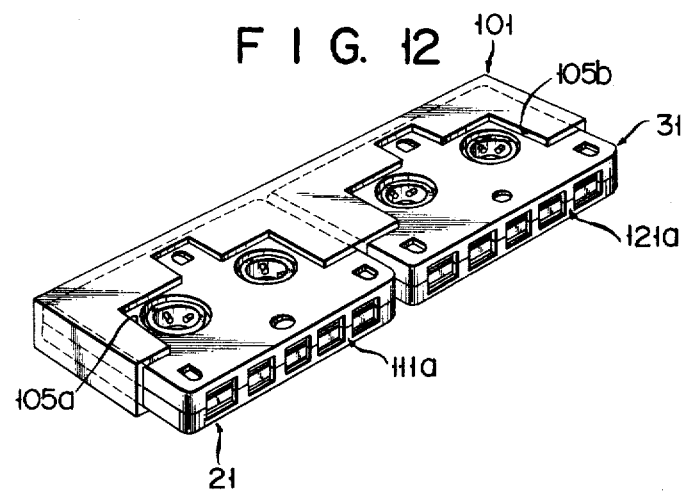
FIG. 12 is a perspective view showing the holder of FIG. 11, in which two microcassettes are held.

FIGS. 11 and 12 show a holder according to another embodiment of this invention. In FIG. 11, a holder 101 is constructed of a flatted, elongated rectangular support. Two microcassette insertion holes are provided side by side at one longitudinal end 101a of the support with a central wall barrier 102 formed in the direction vertical to longitudinal upper and lower panels 101c and 101d of the support, thereby providing a pair of equally sized microcassette loading chambers 103a, 103b with the central wall barrier 102 as a center. T-shaped cutouts 105a, 105b and 106a, 106b are provided at the edge portion of openings 104a and 104b of the support. When two microcassettes 21, 31 are inserted, as shown in FIG. 12, into the holder with their rear portions held in the holder, then the front portions of the microcassettes are left exposed as shown in FIG. 12. In this case, tape hubs and microcassette positioning holes of the microcassettes 21 and 31 are all exposed outside of the holder. That is, all the holes on the upper and lower panels of the microcassettes are left exposed outside of the holder 101. The holder 101 is made of a rigid material and formed very thin in its wall. The holder, therefore, has a thickness substantially similar to that of a single microcassette. If, therefore, the microcassette insertion hole of a tape layer is formed to have a resilient inner surface, the holder can be used in the same way as the single microcassette and without involving any hindrance.

When the microcassette-loaded holder 101 is inserted into a cassette tape player, not shown, with a Stahl type detachable mechanism with, for example, one microcassette 21 alone held in the holder 101, then a capstan, hub drive shafts and microcassette postioning pins of the tape player are inserted into the corresponding capstan inserting hole, hub drive shaft holes and microcassette positioning holes, respectively, of the microcassette 21 to cause the microcassette 21 to be operated in the same way as a single microcassette. When the two microcassettes 21 and 31 are sequentially used, it is only necessary that the holder 101 be first inserted into the tape player with one microcassette held in the player and then the holder 101 be replaced end for end into the player with the other microcassette held in the player for operation. In this case, it is very easy to effect the insertion and removal of the microcassette into and out of the insertion hole of the player, since one half section of the holder juts out of the player for band gripping.

As explained above, the holders of this invention all meet the above-mentioned demands and can be easily obtained as a one-piece molded unit.

Figure 13:
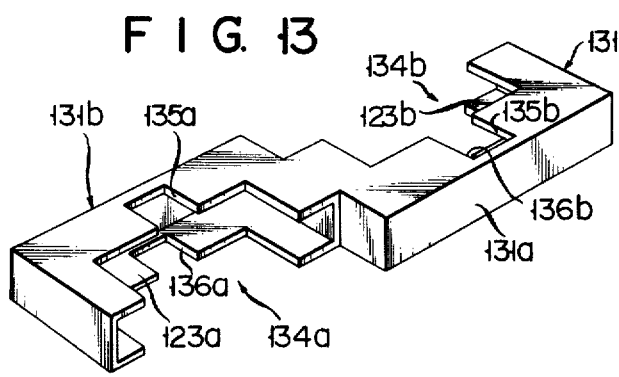
FIG. 13 is a perspective view showing a cassette holder according to a sixth embodiment of this invention.

FIG. 13 is a perspective view showing a microcassette tape holder according to another embodiment of this invention. In the embodiment of FIG. 11 two microcassette holding chambers of the holder are opened at the same side, whereas in FIG. 13 such two microcassette chambers are open in the mutually opposite directions with one half outer side wall of one microcassette chamber 123a jointed to one half outer side wall of the other microcassette 123b chamber. T-shaped cutouts 135a, 136a and 135b, 136b are formed on the open-end edge portions, respectively, of the microcassette chambers 123a, 123b to provide a longitudinally extending, substantially S-shaped flattened support as shown in FIG. 13. The holder of FIG. 13 is substantially similar in its loading state to the holder of FIG. 11 except that the longitudinal rear end surface of each microcassette chamber is located in the same plane as the front end surface of each microcassette. Further explanation of this embodiment is, therefore, omitted. The construction provides a well-balance holder and, when two microcassettes are sequentially used, it is only necessary that the holder be replaced end for end to permit either microcassette to be operated.

In the embodiments shown in FIGS. 11 and 13 however, there is a risk that the microcassettes are slipped out of the holder since they are merely inserted into the holder.

Figure 14:
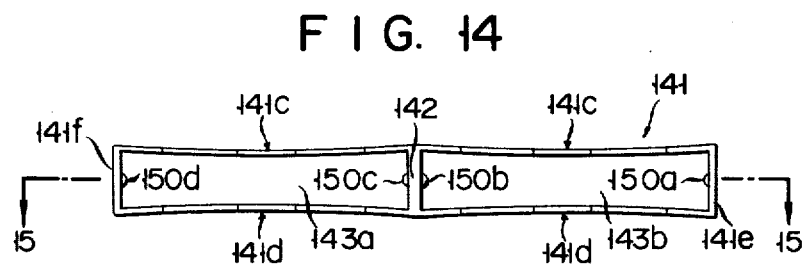
FIG. 14 is a front view showing a cassette holder according to a seventh embodiment of this invention.
Figure 15:
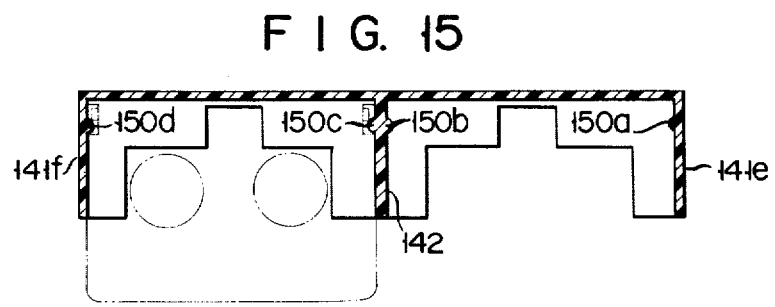
FIG. 15 is a cross-sectional view taken along line 15—15 of FIG. 14.

FIGS. 14 and 15 show a modification of the embodiment of FIG. 11. In this modification, the above-mentioned drawback is circumvented. A cassette holder 141 is made of a rigid, elastic material such a synthetic resin and formed very thin in its walls, and the upper and lower panels 141c and 141d are dished toward the interior of microcassette chambers 143a and 143b. Further, click ridges 15a and 15b are provided on the inner opposite side wall surfaces of the microcassette chambers so as to be engaged with the eroneous erasure preventing lugs. When the microcassettes are inserted into the holder, they are pressed into frictional contact with the dished upper and lower panels of the holder, thereby preventing microcassette clattering in the holder. The click ridges 150a . . . 150d on the holder are snap-fitted into the erroneous erasure preventing lug holes of the microcassettes, thereby preventing the microcassetes from being slipped out of the holder.

Although in this embodiment the click ridges 150a . . . 150d and the dishing of the upper and lower panels of the holder are applied to the embodiment shown in FIGS. 11 and 12, this invention can also be applied to the embodiment of FIG. 13 with the same result.

What is claimed is:

1. In combination, a pair of magnetic tape microcassettes and a magnetic tape cassette holder for receiving a pair of said tape microcassettes and for holding the tape microcassettes in their respective operable conditions without requiring removal from the holder;

each tape microcassette including:

a pair of tape hubs exposed outside the holder, a capstan insertion hole extending therethrough, cassette positioning holes formed at one surface thereof, a magnetic tape fixed at its ends to the hubs and adapted to run between the hubs, an open front end exposing the magnetic tape and a closed rear end opposite the front end; and said magnetic cassette holder comprising:

a one-piece molded synthetic resin body having a pair of cassette receiving and holding chambers located adjacent each other in the same plane, said body having upper and lower panels which are dished toward each other and forming upper and lower surfaces of said chambers, said dished panels being adapted to elastically hold microcassettes therebetween, each chamber having an opening through which a respective microcassette is inserted, the microcassettes being received in their respective chambers in rear end-to-rear end relationship in the same plane, between said dished panels, said chambers further having at least one cutout for permitting all of the hubs, capstan insertion hole, and cassette positioning holes of a microcassette received in a chamber to be exposed for operation of the microcassette, and a stop member located between said pair of holding chambers and which is engageable with inserted microcassettes to limit insertion of said microcassettes into a chamber of the holder such that the front ends of the mirocassettes are operably exposed and said hubs, capstan insertion hole and cassette positioning holes are all operably exposed, whereby the microcassettes are held in said holder in their respective operable conditions without requiring removal from the holder for operation thereof.

2. The combination of claim 1, wherein said cassette holder is fabricated of a substantially rigid material, the dished panels being resilient so as to yield upon insertion of a microcassette therebetween.

* * * * *